United States Patent
Gottlieb et al.

(10) Patent No.: US 9,426,542 B1
(45) Date of Patent: Aug. 23, 2016

(54) AUTOMATING QUALITY ASSURANCE FOR STANDARDIZED CONTENT SHARING

(71) Applicant: Google Inc., Mountain View, CA (US)

(72) Inventors: Lior Gottlieb, San Leandro, CA (US); Leo Dilem, South San Francisco, CA (US)

(73) Assignee: Google Inc., Mountain View, CA (US)

( * ) Notice: Subject to any disclaimer, the term of this patent is extended or adjusted under 35 U.S.C. 154(b) by 128 days.

(21) Appl. No.: 14/161,369

(22) Filed: Jan. 22, 2014

(51) Int. Cl.
*G06F 17/30* (2006.01)
*H04N 21/8543* (2011.01)
*G06F 21/64* (2013.01)

(52) U.S. Cl.
CPC .......... *H04N 21/8543* (2013.01); *G06F 21/645* (2013.01)

(58) Field of Classification Search
None
See application file for complete search history.

(56) References Cited

U.S. PATENT DOCUMENTS

| | | | |
|---|---|---|---|
| 2003/0115281 A1* | 6/2003 | McHenry et al. | 709/213 |
| 2006/0127037 A1* | 6/2006 | Van Hoff et al. | 386/83 |
| 2009/0013189 A1* | 1/2009 | Morvan et al. | 713/176 |
| 2015/0100669 A1* | 4/2015 | Yang et al. | 709/219 |

* cited by examiner

*Primary Examiner* — David Le
(74) *Attorney, Agent, or Firm* — Fenwick & West LLP

(57) ABSTRACT

A system and method for automating quality assurance for standardized content sharing is provided. The system includes a shared content receiver to receive shared content augmented with augmenting data; an authorized provider to determine whether a source of the shared content is authorized to provide shared content to the system; a rule retriever to retrieve rules associated with serving the shared content; an augmenting data checker to determine if the augmenting data is compliant according to the retrieved rules; and a verification transmitter to transmit an indication of whether the augmenting data is compliant.

20 Claims, 5 Drawing Sheets

AUTOMATING QUALITY ASSURANCE FOR STANDARDIZED CONTENT SHARING

BACKGROUND

Digital players, such as embedded media players or locally executed programs, serve content. Content may be video, audio, text, or combinations thereof. The content may be streamed via a network connection, such as the Internet. The content may be published by a third-party publisher or by various visitors to a content sharing service. The content sharing service may be a web site, an application, or any portal accessible via a network connection.

Multiple services may serve content. In order to generate revenue, the services may augment the serving of content with shared content. Shared content may be any content served in-stream with content already being served to a visitor to a content sharing service. The shared content may be sourced from a seller of goods or services, and provide additional information about the goods or service. The shared content may include meta data, and in response to being clicked-through, the shared content may redirect the consumer of content to a third-party service or site.

The shared content may be sourced from an online shared content network. The shared content may be sourced from videos internally generated by the online shared content network, or provided by a third-party publisher.

Due to the existence of multiple content sharing services, and various digital content players, the introduction of shared content may become difficult. Various content sharing services may agree to rely on a singular format for introducing in-stream shared content. For example, the various content sharing services may employ an extended markup language (XML) schema that allows in-stream digital content sharing over multiple formats and players to become possible.

Thus, if a content sharing service supports the XML schema described above, the content sharing service may serve in-stream shared content via multiple sources with ease.

SUMMARY

A system and method for automating quality assurance for standardized content sharing is provided. The system includes a shared content receiver to receive shared content augmented with augmenting data; an authorized provider to determine whether a source of the shared content is authorized to provide shared content to the system; a rule retriever to retrieve rules associated with serving the shared content; an augmenting checker to determine if the augmenting data is compliant according to the retrieved rules; and a verification transmitter to transmit an indication of whether the augmenting data is compliant.

DESCRIPTION OF THE DRAWINGS

The detailed description refers to the following drawings, in which like numerals refer to like items, and in which.

DETAILED DESCRIPTION

Figure 1:
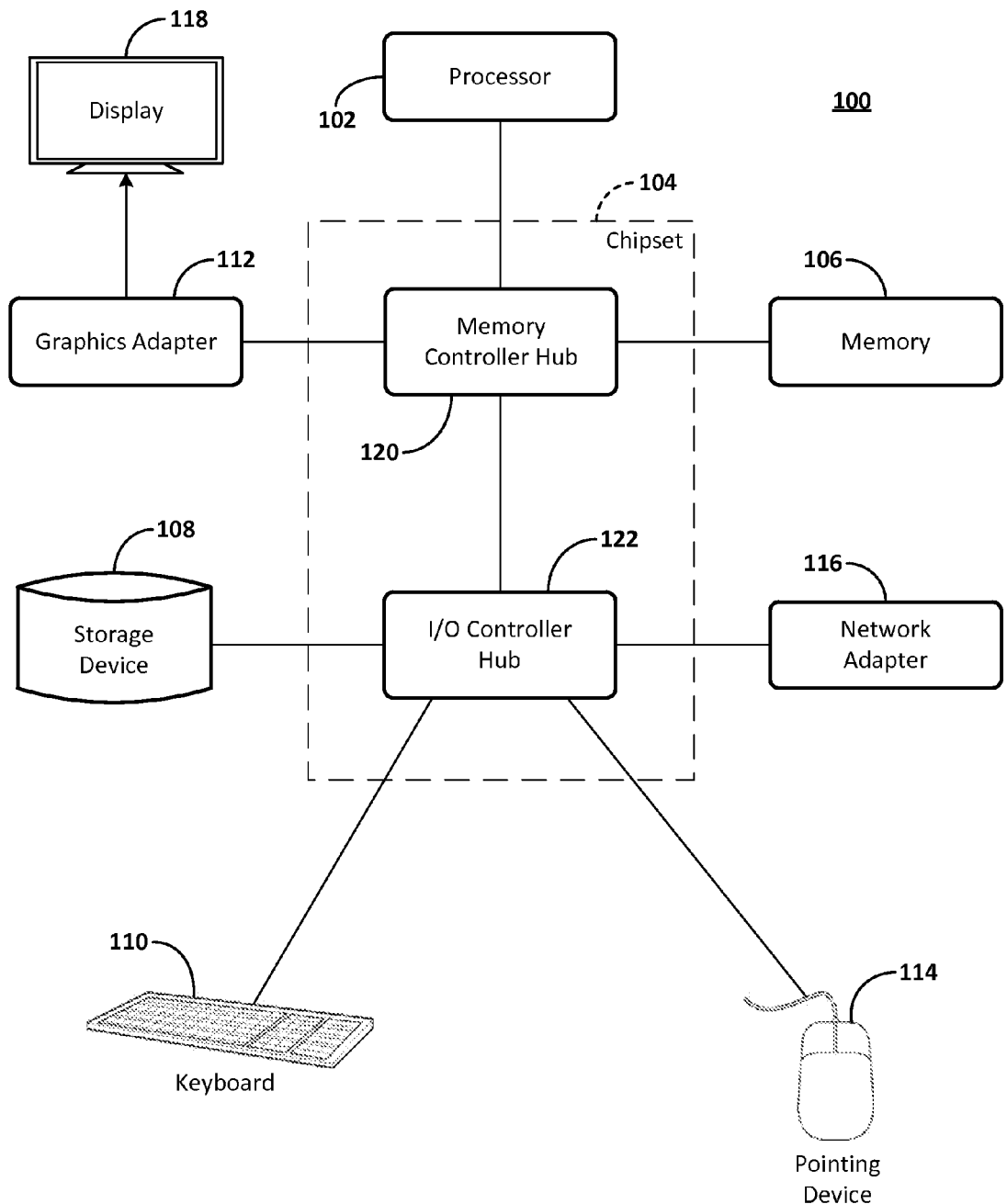
FIG. 1 is a block diagram illustrating an example computer.

Content players, such as those served from content service providers, serve content to visitors to various content sharing services. The content sharing services may employ customized content players, and thus, in response to a request to serve in-stream shared content from a third-party service, the customized content player may not be able to serve the in-stream shared content. The shared content may be distributed from a source, such as an online shared content network. An online shared content network may augment the shared content with meta data, thereby making the shared content engage-able, such as through clicking-through a link.

Thus, a standardized technique may be employed to facilitate the serving of in-stream shared content. In this way, third-parties may submit shared content to a plurality of content sharing services, without having to ensure that the shared content is configured to work with different content players. In certain cases, a XML schema may be employed to facilitate the sharing of the served content to various content sharing services. The XML schema may be served with various tags defining how content is augmented by shared content. For example, the XML schema may contain information about meta data associated with the shared content.

In certain situations, when an online shared content network distributes shared content from third-parties (i.e. content publishers), the online shared content network may benefit from performing a quality assurance (QA). The justification for performing such a QA is that the shared content may be verified for certain characteristics. For example, during the QA, a detection may ascertain whether the shared content has been affected by malware, is of an inappropriate subject matter, in a quality and size not permissible, and the like.

In order to perform the QA process, a manual or time consuming verification may occur. For example, to determine whether the shared content is of an appropriate subject matter, a QA personnel may have to view each shared content, and indicate whether the shared content is of an appropriate subject or quality. Thus, because a manual process is employed, the process to determine whether shared content conforms to both quality and other preferences may be laborious and time-consuming.

Disclosed herein are methods and systems for performing QA on shared content served to an online shared content provider. By performing the QA through the verification of meta tags contained in a data file associated with the shared content, the process of QA becomes more efficient. Further, because QA is performed employing the aspects disclosed herein, a manual or time-consuming process to perform the QA may be effectively avoided.

In situations in which the systems discussed here collect personal information about users, or may make use of personal information, the users may be provided with an opportunity to control whether programs or features collect user information (e.g., information about a user's social network, social actions or activities, profession, a user's preferences, or a user's current location), or to control whether and/or how to receive content from the content server that may be more relevant to the user. In addition, certain data may be treated in one or more ways before it is stored or used, so that personally identifiable information is removed. For example, a user's identity may be treated so that no personally identifiable information can be determined for the user, or a user's geographic location may be generalized where location information is obtained (such as to a city, ZIP code, or state level), so that a particular location of a user cannot be determined.

Thus, the user may have control over how information is collected about the user and used by a content server.

FIG. 1 is a block diagram illustrating an example computer 100. The computer 100 includes at least one processor 102 coupled to a chipset 104. The chipset 104 includes a memory controller hub 120 and an input/output (I/O) controller hub 122. A memory 106 and a graphics adapter 112 are coupled to the memory controller hub 120, and a display 118 is coupled to the graphics adapter 112. A storage device 108, keyboard 110, pointing device 114, and network adapter 116 are coupled to the I/O controller hub 122. Other embodiments of the computer 100 may have different architectures.

The storage device 108 is a non-transitory computer-readable storage medium such as a hard drive, compact disk read-only memory (CD-ROM), DVD, or a solid-state memory device. The memory 106 holds instructions and data used by the processor 102. The pointing device 114 is a mouse, track ball, or other type of pointing device, and is used in combination with the keyboard 110 to input data into the computer 100. The pointing device 114 may also be a gaming system controller, or any type of device used to control the gaming system. For example, the pointing device 114 may be connected to a video or image capturing device that employs biometric scanning to detect a specific user. The specific user may employ motion or gestures to command the point device 114 to control various aspects of the computer 100.

The graphics adapter 112 displays images and other information on the display 118. The network adapter 116 couples the computer system 100 to one or more computer networks.

The computer 100 is adapted to execute computer program modules for providing functionality described herein. As used herein, the term "module" refers to computer program logic used to provide the specified functionality. Thus, a module can be implemented in hardware, firmware, and/or software. In one embodiment, program modules are stored on the storage device 108, loaded into the memory 106, and executed by the processor 102.

The types of computers used by the entities and processes disclosed herein can vary depending upon the embodiment and the processing power required by the entity. The computer 100 may be a mobile device, tablet, smartphone or any sort of computing element with the above-listed elements. For example, a data storage device, such as a hard disk, solid state memory or storage device, might be stored in a distributed database system comprising multiple blade servers working together to provide the functionality described herein. The computers can lack some of the components described above, such as keyboards 110, graphics adapters 112, and displays 118.

The computer 100 may act as a server (not shown) for the content sharing service disclosed herein. The computer 100 may be clustered with other computer 100 devices to create the server. The various computer 100 devices that constitute the server may communicate with each other over a network 250.

Figure 2:
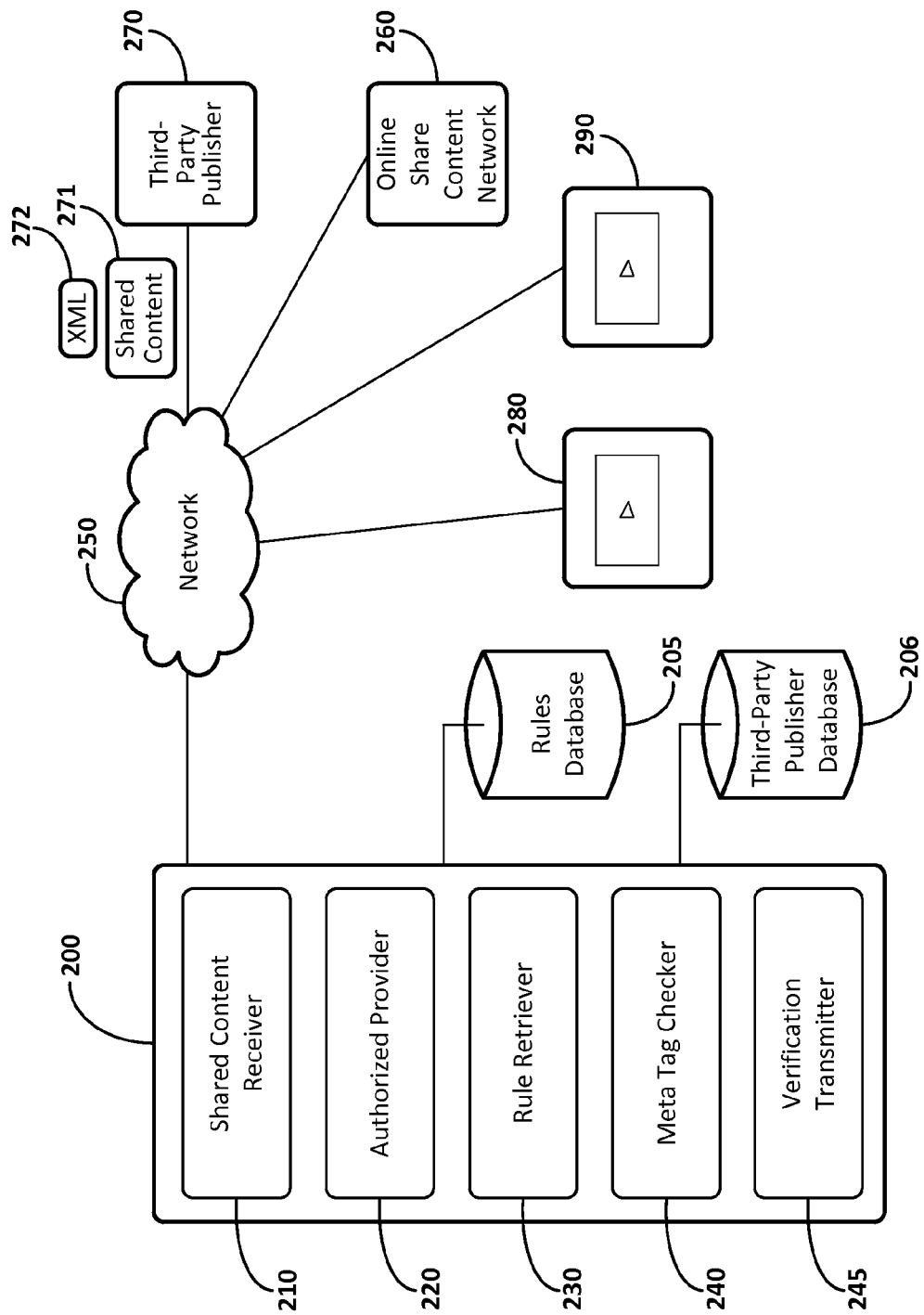
FIG. 2 illustrates an example of a system for automating quality assurance for standardized content sharing.

FIG. 2 illustrates an example of system 200 for automating quality assurance (QA) for standardized content sharing. The system 200 includes a shared content receiver 210, an authorized provider 220, a rule retriever 230, a meta tag checker 240, and a verification transmitter 245. The system 200 may incorporate a rules database 205. The rules database 205 may maintain specific rules associated with a specific content sharing service, such as content provider 280 or 290, or a specific source, such as third party publisher 270.

Also shown in FIG. 2 is an online shared content network 260. The online shared content network 260 serves as a repository for shared content, such as shared content 271. The online shared content network 260 may receive shared content 271 via network 250, and distribute the shared content 271 to various content providers, such as content sharing service 280 and content sharing service 290.

Content sharing service 280 and content sharing service 290 may employ different digital players. However, the online shared content network 260 may serve shared content conforming to an agreed upon format. By being in the agreed upon format, content sharing service 280 and content sharing service 290 may each be capable of serving the shared content 271 to respective visitors to each service. Further, due to the XML data 272 associated and delivered with the shared content 271, various parameters, meta data, and other information may facilitate in serving the shared content 271.

In the example shown in FIG. 2, XML data is used to augment the shared content 271. However, one of ordinary skill in the art may employ any sort of augmenting data associated with shared content 271 to ensure that the shared content 271 is compliant with an employed video or content sharing standard.

The shared content receiver 210 receives shared content 271 and XML data 272 from a third-party publisher 270 via network 250. The shared content 271 and XML data 272 may be transmitted to an online shared content network 260. As explained above, the online shared content network 260 may serve as a repository for sharing and serving shared content, such as shared content 271. Accordingly, in response to a content sharing service, such as content sharing service 280 and content sharing service 290 requesting shared content from the online shared content network 260, the online shared content network 260 delivers shared content to the requesting content sharing service.

The XML data 272 may be a single file, or a plurality of files, with each file containing information about the shared content. The XML data 272 may be coded and tagged in a way that conforms to an agreed upon standard. One such standard employed in the serving of shared content is the "Video Advertisement Standard Template (VAST)". By employing the rules dictated by VAST, various content providers may receive shared content from different sources over the network 250 and seamlessly integrate the shared content with content being served.

The authorized provider 220 determines whether a source of the shared content 271 is authorized to provide shared content via the online shared content network 260. The authorized provider 220 may refer to a third-party publisher database 206. In this way, an implementer of system 200 may effectively control the sources of shared content.

The rule retriever 230 retrieves a rule (or rules) associated with serving shared content 260 from the rules database 205. The rule retriever 230 may retrieve a default set of rules, or alternatively or in addition to, retrieve rules assigned or preset based on the third-party publisher, such as third-party publisher 270, associated with shared content 271.

The rules may define certain aspects and parameters associated with the shared content being sourced from a specific third-party publisher. Certain meta tags may be permitted for some third-party publishers, while certain meta tags may be prohibited. For example, a specific third-party publisher may be allowed to insert a tracking pixel, while another third-party publisher may not be allowed to insert a tracking pixel.

The meta tag checker 240 determines, based on the retrieved rules, whether the XML data 272 is compliant. In FIG. 2, a meta tag checker 240 is shown. However, one of ordinary skill in the art may substitute the meta tag checker 240 with any sort of augmented data checker that verifies additional data added to content, such as standardized videos.

For example, based on the XML data 272, certain aspects about how the shared content 271 serving is defined. Thus, based on the rules, the shared content 271 may be verified to ensure that the shared content 271 is within the predefined rules associated with all shared content providers or specifically for the third-party publisher 270.

For example, the shared content 271 may be verified to ensure that the shared content 271 is within an acceptable resolution or length. By performing this check, the shared content 271 may be within an acceptable quality and latency range. In this way, shared content 271 may not cause latency issues to various content sharing services the shared content 271 is served to.

In another example, the meta tag checker 240 may ascertain whether the meta tags encoded in the XML data 272 contains re-directs to allowed services and web sites. In this way, potentially non-authorized re-directs are filtered out of shared content served via the online shared content network 260. Thus, the various content sharing services, such as content sharing service 280 and content sharing service 290, may not serve shared content that re-directs visitors to non-authorized sites or services, or content that contains malware.

In another example, the rules may define which formats need to be supported via the XML data 272. For example, an online shared content network 260 may establish a predefined set of formats which need to be supported. If the predefined set of formats are not supported, the XML data 272 may be determined to be non-compliant.

The verification transmitter 245 transmits an indication of whether the shared content 271 and the XML data 272 is authorized. Thus, if the indication dictates that the shared content 271 and XML data 272 is authorized, the online shared content network 260 may serve the shared content 271 to various content sharing services. Conversely, if the indication dictates that a predefined rule, for example those enumerated above, are violated, the indication that the shared content 271 and the XML data 272 are not compliant may be communicated to the third-party publisher 270 and the online shared content network 260.

Thus, employing the aspects disclosed in regards to system 200, an online shared content network 260 may ensure that shared content sourced from a plurality of sources undergoes a QA process in an efficient and stream-lined manner.

Figure 3:
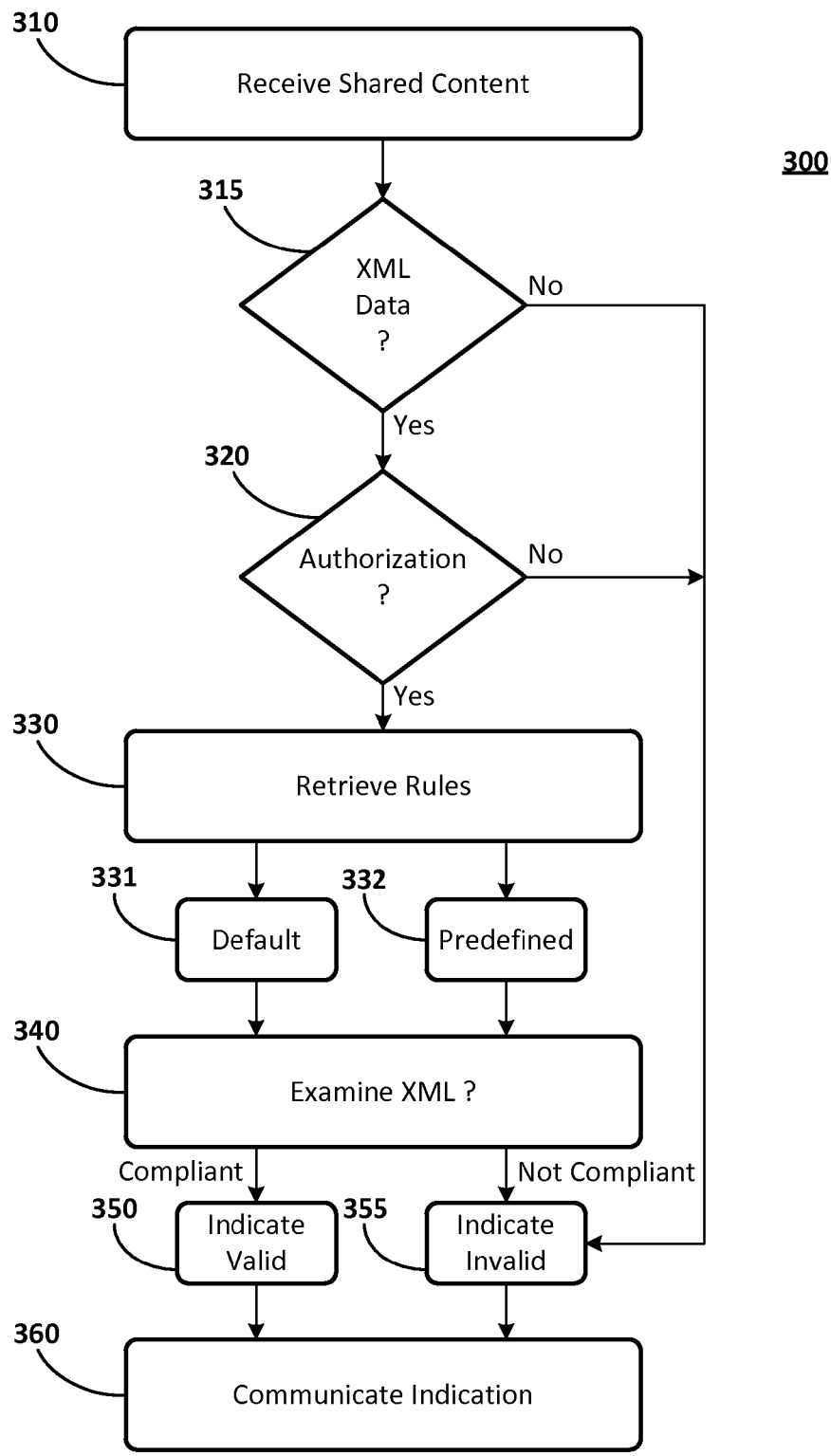
FIG. 3 illustrates an example of a method for automating quality assurance for standardized content sharing.

FIG. 3 illustrates an example of method 300 for automating quality assurance (QA) for standardized content sharing. The method 300 may be performed on a device, such as system 200.

In operation 310, shared content to analyze is received. The shared content may be sourced from various third-party publishers. Alternatively, the distributor of the shared content may self-publish or provide shared content as well.

In operation 315, a determination is made as to whether the shared content contains XML data. If yes, the method 300 proceeds to operation 320. If no, the method 300 proceeds to operation 355. The XML data ensures that the shared content is compliant with an agreed upon standard employed to distributed shared content via various online digital players.

In operation 330, rules associated with the source of the shared content are retrieved. Method 300 may proceed to operation 331, where a default set of rules are retrieved. Alternatively, method 300 may proceed to operation 332, where a predefined set of rules for a specific third-party publisher are retrieved.

In operation 340, the XML data associated with the shared content is analyzed. The analysis may be substantially similar to the operations performed by the meta tag checker 240. A detailed example of meta tag checking is described below with regards to FIG. 4.

If based on the analysis performed in operation 340, a determination is made that the XML data is compliant based on the rules retrieved in operation 330, the method 300 proceeds to operation 350, where an indication of valid is set. Conversely, if the analysis determines the XML data is not compliant, in operation 355 an indication of invalid is set.

Subsequently, in operation 360, the indication is communicated. A receiver of the indication may determine to serve and distribute the shared content based on the indication. Conversely, the source of shared content may employ the indication to ameliorate problems or deficiencies with the XML data.

In another example, the rules may dictate that the meta tags may allow a user to be redirected to a specific set of services or web sites. Thus, if the meta tag includes information associated with a non-allowed web site or service, the shared content may be rejected. Other aspects, such as the latency of the shared content, the resolution, the subject matter, and the like may also be defined by the rules.

Figure 4:
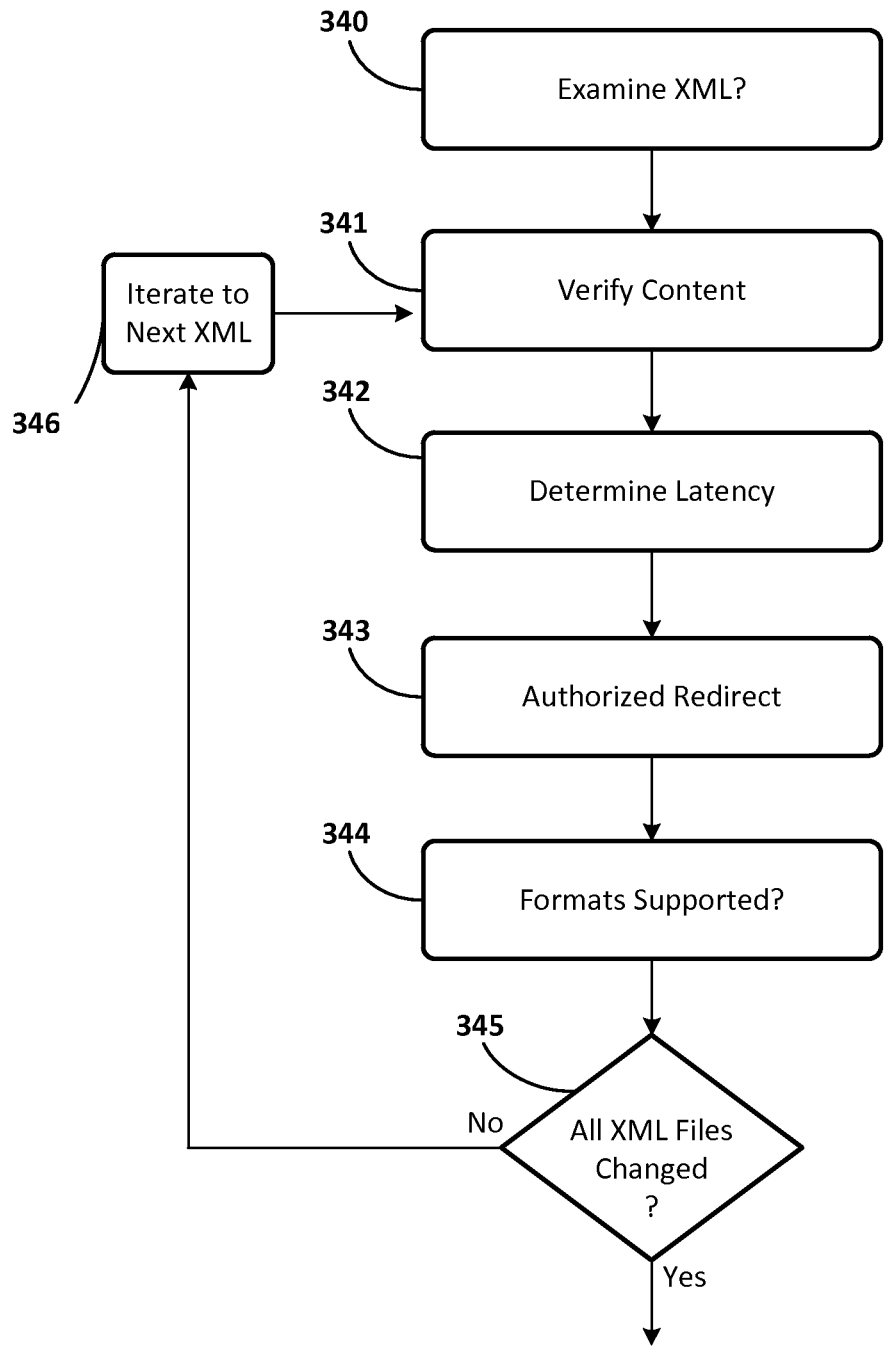
FIG. 4 illustrates an example of the method described in FIG. 3.

FIG. 4 illustrates an example of operation 340 for examining XML data of method 300.

As shown in FIG. 4, in response to method 300 proceeding to operation 340, the following operations of meta tag checking may commence. Operations 341 through 344 are exemplary, and an implementer of method 300 may selectively implement all, some, or none of the operations based on a desired configuration.

In operation 341, the content is verified. The subject matter and appropriateness of the content may be determined via information associated with the meta tag enclosed in the XML data. Accordingly, prohibited content may be effectively filtered out.

In operation 342, latency associated with the XML data is checked to ensure that the shared content is within an acceptable predetermined range of latency. The meta tag information may contain information about the size, length, and other latency affecting parameters. Accordingly, in operation 342, the quality and speed of the shared content may be determined to be within a specific and acceptable range.

In operation 343, the meta tag is analyzed for authorized services or web sites to be re-directed to. Accordingly, if the meta tag contains links to non-authorized web sites or services, the XML data may be determined to be non-compliant.

In operation 344, the meta tag is verified as to whether the information contained therein supports all the required formats. The implementer of method 300 may require that a predetermined set of formats be supported. Accordingly, if based on the information contained in the meta tag that some or none of the predetermined set of formats are supported, the XML data being analyzed may be determined as non-compliant.

In operation 345, a determination is made as to whether all the XML data files have been analyzed. In certain cases, a third-party publisher may serve shared content with multiple XML data files (in order to provide alternate ways of serving the shared content with different meta information). Accordingly, employing the aspects disclosed herein, the method 300 may perform multiple iterations of QA on the various XML data files (operation 346).

The implementer of method 300 may cap the number XML data files in which the third-party publisher may augment shared content with. Accordingly, in response to the number of XML data files undergoing QA reaching the capped number, the method 300 may proceed to the next operation (operation 350). The XML data files over the capped amount may be transmitted back to the source, and deemed not compliant.

Figure 5:
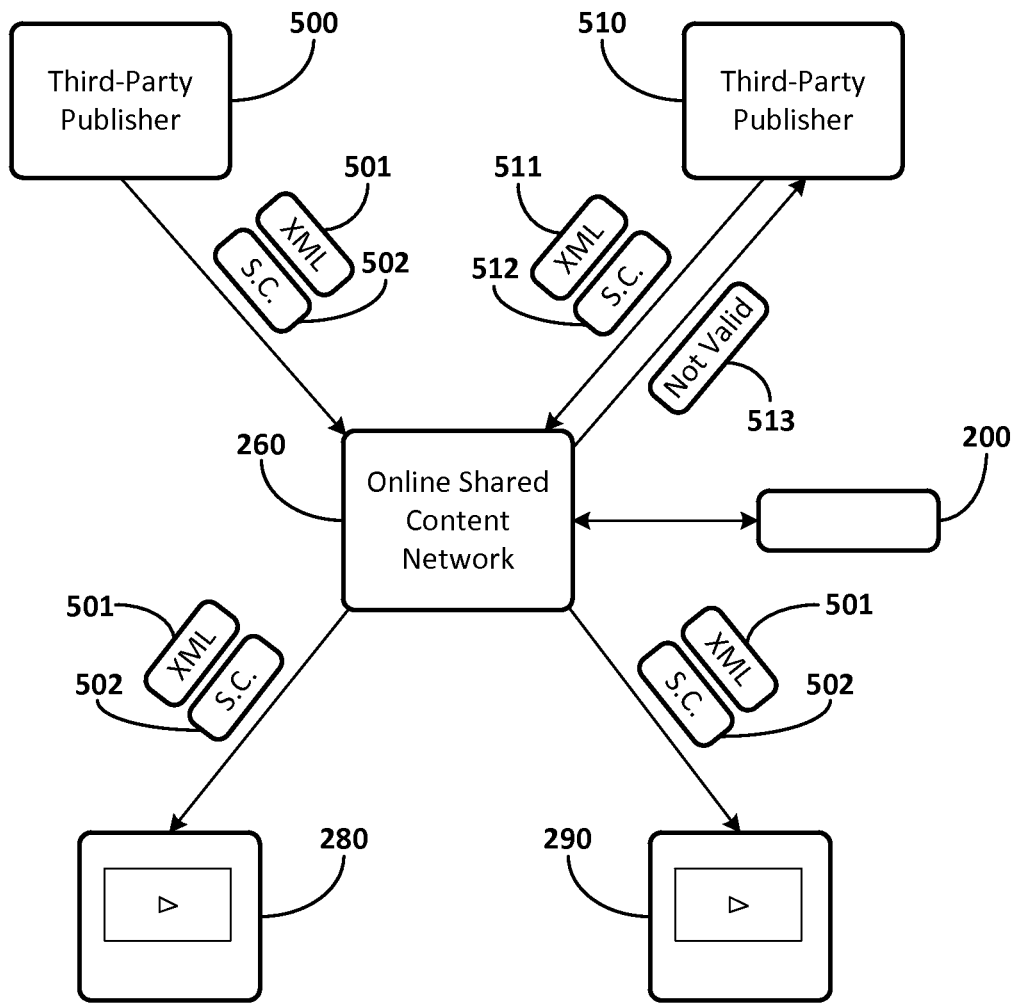
FIG. 5 illustrates an example implementation of the system described in FIG. 2.

FIG. 5 illustrates an example implementation of system 200.

Referring to FIG. 5, a third-party publisher 500 and a third-party publisher 510 are shown. Each third-party publisher is associated with XML data and shared content, respectively. Third-party publisher 500 serves XML data 501 and shared content 502, and third-party publisher 510 serves XML data 511 and shared content 512, which are transmitted to the online shared content network 260.

The online shared content network 260 employs the system 200 described above. In the example shown, the XML data 501 is deemed compliant, and the XML data 511 is deemed not compliant. The system 200 may implement any or all of the verification operations described in FIG. 4. For example, the XML data 511 may contain re-directs to unauthorized services or web sites. Accordingly, the QA performed by system 200 may detect this via the meta tag information encoded within XML data 511, and accordingly transmit a not valid indication 513 back to the third-party publisher 510.

Subsequently, the online shared content network 260 may serve and distribute shared content 502 to various content sharing services, such as content sharing service 280 and content sharing service 290.

Certain of the devices shown in FIG. 1 include a computing system. The computing system includes a processor (CPU) and a system bus that couples various system components including a system memory such as read only memory (ROM) and random access memory (RAM), to the processor. Other system memory may be available for use as well. The computing system may include more than one processor or a group or cluster of computing system networked together to provide greater processing capability. The system bus may be any of several types of bus structures including a memory bus or memory controller, a peripheral bus, and a local bus using any of a variety of bus architectures. A basic input/output (BIOS) stored in the ROM or the like, may provide basic routines that help to transfer information between elements within the computing system, such as during start-up. The computing system further includes data stores, which maintain a database according to known database management systems. The data stores may be embodied in many forms, such as a hard disk drive, a magnetic disk drive, an optical disk drive, tape drive, or another type of computer readable media which can store data that are accessible by the processor, such as magnetic cassettes, flash memory cards, digital versatile disks, cartridges, random access memories (RAMs) and, read only memory (ROM). The data stores may be connected to the system bus by a drive interface. The data stores provide nonvolatile storage of computer readable instructions, data structures, program modules and other data for the computing system.

To enable human (and in some instances, machine) user interaction, the computing system may include an input device, such as a microphone for speech and audio, a touch sensitive screen for gesture or graphical input, keyboard, mouse, motion input, and so forth. An output device can include one or more of a number of output mechanisms. In some instances, multimodal systems enable a user to provide multiple types of input to communicate with the computing system. A communications interface generally enables the computing device system to communicate with one or more other computing devices using various communication and network protocols.

The preceding disclosure refers to a number of flow charts and accompanying descriptions to illustrate the embodiments represented in FIGS. 3 and 4. The disclosed devices, components, and systems contemplate using or implementing any suitable technique for performing the steps illustrated in these figures. Thus, FIGS. 3 and 4 are for illustration purposes only and the described or similar steps may be performed at any appropriate time, including concurrently, individually, or in combination. In addition, many of the steps in these flow charts may take place simultaneously and/or in different orders than as shown and described. Moreover, the disclosed systems may use processes and methods with additional, fewer, and/or different steps.

Embodiments disclosed herein can be implemented in digital electronic circuitry, or in computer software, firmware, or hardware, including the herein disclosed structures and their equivalents. Some embodiments can be implemented as one or more computer programs, i.e., one or more modules of computer program instructions, encoded on a tangible computer storage medium for execution by one or more processors. A computer storage medium can be, or can be included in, a computer-readable storage device, a computer-readable storage substrate, or a random or serial access memory. The computer storage medium can also be, or can be included in, one or more separate tangible components or media such as multiple CDs, disks, or other storage devices. The computer storage medium does not include a transitory signal.

As used herein, the term processor encompasses all kinds of apparatus, devices, and machines for processing data, including by way of example a programmable processor, a computer, a system on a chip, or multiple ones, or combinations, of the foregoing. The processor can include special purpose logic circuitry, e.g., an FPGA (field programmable gate array) or an ASIC (application-specific integrated circuit). The processor also can include, in addition to hardware, code that creates an execution environment for the computer program in question, e.g., code that constitutes processor firmware, a protocol stack, a database management system, an operating system, a cross-platform runtime environment, a virtual machine, or a combination of one or more of them.

A computer program (also known as a program, module, engine, software, software application, script, or code) can be written in any form of programming language, including compiled or interpreted languages, declarative or procedural languages, and the program can be deployed in any form, including as a stand-alone program or as a module, component, subroutine, object, or other unit suitable for use in a computing environment. A computer program may, but need not, correspond to a file in a file system. A program can be stored in a portion of a file that holds other programs or data (e.g., one or more scripts stored in a markup language document), in a single file dedicated to the program in question, or in multiple coordinated files (e.g., files that store one or more modules, sub-programs, or portions of code). A computer program can be deployed to be executed on one computer or on multiple computers that are located at one site or distributed across multiple sites and interconnected by a communication network.

To provide for interaction with an individual, the herein disclosed embodiments can be implemented using an interactive display, such as a graphical user interface (GUI). Such GUI's may include interactive features such as pop-up or pull-down menus or lists, selection tabs, scannable features, and other features that can receive human inputs.

The computing system disclosed herein can include clients and servers. A client and server are generally remote from each other and typically interact through a communications network. The relationship of client and server arises by virtue of computer programs running on the respective computers and having a client-server relationship to each other. In some embodiments, a server transmits data (e.g., an HTML page) to a client device (e.g., for purposes of displaying data to and receiving user input from a user interacting with the client device). Data generated at the client device (e.g., a result of the user interaction) can be received from the client device at the server.

We claim:

1. A system for automating quality assurance (QA) for standardized content sharing, comprising:
    a data store comprising a non-transitory computer readable medium storing a program of instructions for the automating of QA;
    a microprocessor that executes the program of instructions;
    a shared content receiver to:
        receive shared content to be served in-stream with primary content presented in a content sharing service, and
        receive, from a source of the shared content, augmenting data that describes one or more characteristics of the shared content in a pre-determined format, the pre-determined format specified by the shared content receiver;
    an authorized provider to determine whether a source of the shared content is authorized to provide shared content to the system;
    a rule retriever to retrieve rules associated with serving the shared content, at least one of the retrieved rules indicating a type of content that the source of the shared content is allowed to present in the content sharing service;
    an augmenting data checker to determine if the augmenting data is compliant according to the retrieved rules; and
    a verification transmitter to transmit an indication of whether the augmenting data is compliant.

2. The system according to claim 1, wherein the augmenting data checker determines if the augmenting data is compliant by verifying the shared content's subject matter.

3. The system according to claim 1, wherein the augmenting data checker determines if the augmenting data is compliant by determining a latency associated with the augmenting data.

4. The system according to claim 1, wherein the augmenting data checker determines if the augmenting data is compliant by determining whether sites and services redirected to are authorized.

5. The system according to claim 1, wherein the augmenting data checker determines if the augmenting data is compliant by determining whether a predetermined set of formats are supported.

6. The system according to claim 1, wherein the retrieved rules are associated with the shared content's source.

7. The system according to claim 1, wherein the retrieved rules are based on a default setting.

8. The system according to claim 1, wherein the augmenting data includes a plurality of files, and the augmenting data checker iteratively performs the determination for a predetermined number of the plurality of files.

9. The system according to claim 1, wherein the indication is communicated to the source of the shared content if the augmenting data checker determines the augmenting data is not compliant, and is communicated to an online shared content network if the augmenting data is compliant.

10. A computer-implemented method for automating quality assurance (QA) for standardized content sharing, comprising:
    receiving shared content to be served in-stream with primary content presented in a content sharing service;
    receiving, from a source of the shared content, augmenting data that describes one or more characteristics of the shared content in a pre-determined format, the pre-determined format specified by the shared content receiver;
    determining whether a source of the shared content is authorized to provide shared content;
    retrieving rules associated with serving the shared content, at least one of the retrieved rules indicating a type of content that the source of the shared content is allowed to present in the content sharing service;
    determining if the augmenting data is compliant according to the retrieved rules; and
    transmitting an indication of whether the augmenting data is compliant,
    wherein at least one of the receiving, the determining, the retrieving, and the transmitting is performed on a microprocessor.

11. The method according to claim 10, wherein determining if the augmenting data is compliant comprises verifying the shared content's subject matter.

12. The method according to claim 10, wherein determining if the augmenting data is compliant comprises determining a latency associated with the augmenting data.

13. The method according to claim 10, determining if the augmenting data is compliant comprises determining whether sites and services redirected to are authorized.

14. The method according to claim 10, wherein determining if the augmenting data is compliant comprises determining whether a predetermined set of formats are supported.

15. The method according to claim 10, wherein the retrieved rules are associated with the shared content's source.

16. The method according to claim 10, wherein the retrieved rules are based on a default setting.

17. The method according to claim 10, wherein the augmenting data includes a plurality of files, and determination further comprises iteratively performing the determination for a predetermined number of the plurality of files.

18. The method according to claim 10, wherein the indication is communicated to the source of the shared content if the augmenting data is determined to not be compliant, and is communicated to an online shared content network if the augmenting data is determined to be compliant.

19. The system according to claim 1, wherein the augmenting data is defined by an Extended Markup Language (XML).

20. The method according to claim 10, wherein the augmenting data is defined by an Extended Markup Language (XML).

* * * * *